July 25, 1961     H. G. PARKE     2,994,039
SELF-PROTECTING METER
Filed Jan. 19, 1960
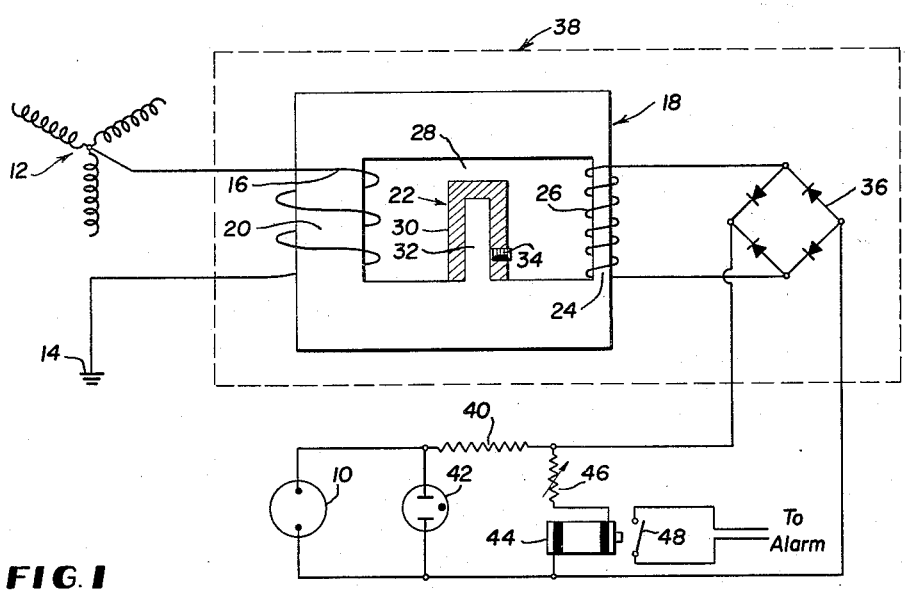
FIG.1
FIG.2
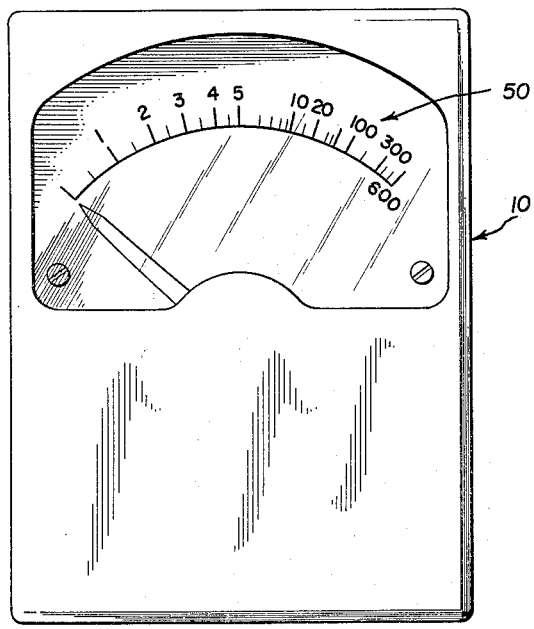
INVENTOR.
HARRY G. PARKE 2,994,039
SELF-PROTECTING METER
Harry G. Parke, Brooklyn, N.Y., assignor to Marine Electric Corporation, Brooklyn, N.Y., a corporation of New York
Filed Jan. 19, 1960, Ser. No. 3,333
2 Claims. (Cl. 324—110)

This invention relates to a self-protecting meter and more particularly to a portable ammeter having high sensitivity in a lower range, a less sensitive and wide self-protected upper range and which does not require range switching.

It is a primary object of the invention to provide a highly sensitive ammeter, or other electrical measuring instrument, which will respond accurately to very small currents and still carry very large currents without damage.

Another object of the invention is to provide a general purpose meter which is self-protected by connection to the secondary winding of a transformer whose magnetic circuit is so arranged as to permit leakage of the primary flux to avoid the secondary at high primary currents.

A further object of the invention is to provide a self-protected meter, of the character indicated above, wherein the transformer comprises an adjustable air gap in the flux leakage path which enables calibration of the meter substantially to a predetermined non-linear scale to compensate for variations in the transformer core material.

Still another object of the invention is to provide a self-protected meter of the indicated character wherein additional protection above that afforded by the transformer is given by the inclusion of a glow tube in parallel with the meter whereby to limit the voltage applied to the meter to the break down voltage of the glow tube.

A still further object of the invention is to provide a ground current meter of the indicated character wherein is additionally provided means for sounding an alarm whenever the ground current exceeds a preselected value.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

FIG. 1 is a schematic diagram illustrating a preferred embodiment of the invention as applied to the measurement of ground currents; and FIG. 2 is an elevational view of an ammeter according to the invention showing the nonlinear scale.

While it will be readily understood that the present invention relates to indicating instruments having general application, a preferred embodiment illustrated in the drawings has been selected to exemplify its use as a ground current meter to measure the flow of current between the neutral of an A.C. power system and a grounded metallic structure, such as the hull of a ship. It is considered good practice for personnel safety to ground the power system neutral through a low impedance and thus limit the maximum line to ground voltage. When this is done, any secondary ground on the system will short circuit part of the system, draw a very large current and trip out the ship power circuit breakers. Since most faults to ground draw a small leakage current for some time before breaking down into a dead short, a sensitive current meter in the neutral ground leg would give valuable warning of impending trouble. Unfortunately the entire fault current of a serious fault must also pass through this meter and would completely destroy any conventional sensitive instrument. This problem, which has not been previously solved, is solved by an instrument according to the present invention.

Referring now more particularly to the drawings, FIG. 1 schematically illustrates a meter 10 connected to measure the ground current of a shipboard power system 12. The neutral of the power system, shown here as a three phase Y but which obviously may be any other type, is connected to ground 14 through the primary winding 16 of transformer 18. Preferably the laminated iron core of transformer 18 is constructed with three legs 20, 22 and 24. Primary winding 16 is wound around leg 20. The secondary winding 26 is wound about leg 24 which is of substantially smaller cross-section than the rest of the magnetic circuit. Leg 22 of the core is a magnetic flux shunting leg and is interrupted by an air gap 28. Preferably the core shunt leg 22 is made in two parts 30 and 32 the former of which is slidable on the latter whereby to adjust the air gap 28. Parts 30 and 32 may be locked in adjusted relation by any suitable means such as the locking screw 34.

Because of the superior characteristics of D.C. meters and relays as compared to A.C. ones, it is desirable, although not necessary, to use a D.C. volt meter as the measuring instrument 10 and to connect this to the transformer secondary 26 through a full wave bridge rectifier 36. It is convenient to mount this rectifier and transformer 18 in a common enclosure 38. The transformer, rectifier and meter 10 are calibrated together but need not be mounted together. The voltmeter 10 may be remotely located on a switchboard or wherever convenient.

If it is desired to use an extremely low reading scale on meter 10, a resistor 40 is connected in series therewith and a glow discharge tube 42 in parallel with the meter. Normally glow tube 42 will remain de-energized and ineffective, but in the event of an extreme overload will limit the voltage across meter 10 to the breakdown voltage of glow tube 42.

If it is desired to render a visual or audible alarm upon reaching a preselected, dangerous ground current value, a relay 44 in series with a rheostat 46 may be placed in parallel with meter 10. The relay contacts 48 are connected to an alarm, not shown, so that the alarm will sound when the ground current present in primary winding 16 and hence a preselected voltage across meter 10 is exceeded. The sensitivity of the alarm relay may be adjusted by means of the rheostat 46.

The operation of the described apparatus to protect the meter while allowing it to read excessively large ground currents is as follows. When a small current flows through primary winding 16 substantially all of the magnetic flux generated passes through the core leg 24 since the shunt leg 22 is interrupted by an air gap. Therefore the voltage induced in secondary winding 26 is linearly proportioned to the current through the primary winding. At higher currents, however, core leg 24 because of its small cross section saturates causing an increasing proportion of the flux to be divided and pass through the shunt leg 22. As a result, at higher currents, the voltage induced in the secondary winding 26 is a very nonlinear function of the current passing through the primary winding of the transformer. Accordingly, the voltmeter scale 50 takes the appearance shown in FIG. 2 wherein the small current values under ten amperes are easily and sensitively discernible while the high range values up to 600 amperes are crowded into the short upper portion of the scale. During calibration of the meter and transformer together, the length of air gap 28 may be adjusted by moving the core leg parts 30 and 32 relative to each other. This will compensate for variations in the core materials of different transformers and enable calibration of different meters to substantially the same scale.

It is apparent from the above description that the described apparatus is not limited to use as a ground current meter, but has application as a wide range portable ammeter with nonlinear response in the upper current range. Its use for such purpose requires no switching of range scales. While the invention has been described in its application to the measurement of current, other electrical attributes such as voltage may be measured by a meter such as described. It would appear, therefore, that the invention is broadly applicable as an overload protective arrangement for electrical measuring instruments in general.

Although a certain specific embodiment of the invention has been shown and described, it is obvious that many modifications thereof are possible. The invention, therefore, is not to be restricted except insofar as is necessitated by the prior art and by the spirit of the appended claims.

What is claimed is:

1. In an A.C. power system including a grounded metallic structure such as the hull of a ship, a warning device for measuring the flow of current between the neutral of the A.C. power system and the grounded metallic structure, said warning device including a transformer having a core provided with three legs, one of said legs being of reduced cross-section and magnetically saturable, a second of said legs having an air gap, a primary winding on the third leg establishing the aforementioned connection between neutral and ground, a secondary winding on said one leg, and an indicating istrument connected to said secondary winding to detect small current leakages from neutral to ground.

2. The system according to claim 1 wherein means is provided for adjusting said air gap.

References Cited in the file of this patent

UNITED STATES PATENTS

| | | |
|---|---|---|
| 1,800,999 | Haskell | Apr. 14, 1931 |
| 1,952,072 | Jewell | Mar. 27, 1934 |
| 2,269,227 | Rowell | Jan. 6, 1942 |
| 2,671,874 | Friedrichs | Mar. 9, 1954 |